United States Patent [19]

Nelson

[11] Patent Number: 4,894,401

[45] Date of Patent: Jan. 16, 1990

[54] COLOR STABILIZED IRRADIATED POLYCARBONATE COMPOSITIONS

[75] Inventor: Linda H. Nelson, Evansville, Ind.

[73] Assignee: General Electric Company, Mt. Vernon, Ind.

[21] Appl. No.: 944,035

[22] Filed: Dec. 22, 1986

[51] Int. Cl.$^4$ .................. C08K 5/15; C08F 283/02
[52] U.S. Cl. ................ 524/109; 524/114; 525/461; 525/462; 525/463; 522/75; 522/143
[58] Field of Search ................ 522/75, 143; 524/109, 524/114; 525/461, 462, 463

[56] References Cited

U.S. PATENT DOCUMENTS

| | | | |
|---|---|---|---|
| 3,098,056 | 7/1963 | Schnell et al. | 525/463 |
| 3,489,716 | 1/1970 | Calkins | 525/463 |
| 3,634,312 | 1/1972 | Babillis et al. | 524/109 |
| 3,833,537 | 9/1974 | Jacquiss | 524/109 |
| 3,839,247 | 10/1974 | Bialous et al. | 524/114 |
| 3,978,020 | 8/1976 | Liberti | 524/109 |
| 4,110,185 | 8/1978 | Williams et al. | 522/79 |
| 4,556,681 | 12/1985 | Liberti et al. | 524/109 |
| 4,581,382 | 4/1986 | Liberti et al. | 524/114 |

FOREIGN PATENT DOCUMENTS

| | | | |
|---|---|---|---|
| 2206720 | 8/1973 | Fed. Rep. of Germany | 524/109 |
| 2400045 | 7/1974 | Fed. Rep. of Germany | 525/461 |
| 2402367 | 7/1974 | Fed. Rep. of Germany | 524/109 |
| 0174322 | 10/1982 | Japan | 522/143 |

OTHER PUBLICATIONS

Chemical Abstracts, vol. 86, No. 97768t, 1977, p. 549.
Degradation and Stabilization of Polymers, vol. 1, 1983, pp. 618-620.

Primary Examiner—Morton Foelak
Assistant Examiner—Kriellion Morgan
Attorney, Agent, or Firm—Martin Barancik

[57] ABSTRACT

A composition sufficiently irradiated to achieve sterilization comprising:
(i) at least one aromatic carbonate resin; and
(ii) an antiyellowing upon exposure to sterilizing irradiation effective amount of at least one effective epoxide compound.

11 Claims, No Drawings

COLOR STABILIZED IRRADIATED POLYCARBONATE COMPOSITIONS

BACKGROUND OF THE INVENTION

Aromatic carbonate polymers are well known thermoplastic materials which, due to their many advantageous properties, find use as thermoplastic engineering materials. The aromatic carbonate polymers exhibit, for example, excellent properties of toughness, impact resistance, heat resistance and dimensional stability. Not only are molded parts prepared from aromatic carbonate polymers, but films and and sheet materials as well. Because of its excellent property spectrum, aromatic carbonate polymers such as aromatic polycarbonates have been proposed for various utilities including those relating to medical packaging, for example the containers in which syringes, surgical instruments, intravenous fluids, operating room devices, and the like are maintained or stored. Additionally polycarbonate resins have been used in medical devices such as blood oxygenators, anesthesia canisters, intravenous connectors and accessories, blood centrifuge bowls, surgical instruments and operating room instruments. The toughness of the polycarbonate as well as its clarity, high heat resistance, strength and good blood compatibility make it a potential substance of choice in this high technology medical device and packaging market. Sterilization of these articles used in the medical arts and other technologies is often times required.

However, one particular difficulty with certain sterilization techniques has been discovered. A typical method of sterilizing various objects useful in the medical field is through irradiation. The type of radiation usually employed is low level gamma radiation. It is readily apparent that the level of gamma radiation which accomplishes the sterilization is significantly above that of ordinary background radiation. When exposed to radiation which is of sufficient strength and duration to sterilize various objects, the aromatic carbonate polymeric material is subject to yellowing. This yellowing changes the color of the aromatic carbonate resin, thus reducing its utility for this particular application. Not only packaging materials such as flexible aromatic carbonate film and sheet products but also molded parts as well suffer from this yellowing phenomonon.

A new family of additives has been discovered which inhibits yellowing of aromatic carbonate polymers after exposure to sterilizing irradiation. By sterilizing irradiation is meant irradiation which kills microorganisms.

SUMMARY OF THE INVENTION

In accordance with the invention there is provided a composition sufficiently irradiated to achieve sterilization comprising an aromatic carbonate resin in admixture with an anti-yellowing upon exposure to sterilizing irradiation effective quantity of a certain epoxide compound.

In further accordance with the invention there is a method for reducing yellowing of an irradiated aromatic carbonate polymer which comprises irradiating a composition comprising an aromatic carbonate polymer and an anti-yellowing upon exposure to sterilizing irradiation effective amount of an epoxide compound.

A further aspect of the invention is a composition comprising an aromatic carbonate polymer in admixture with an anti-yellowing upon exposure to sterilizing irradiation effective amount of a certain epoxide compound.

DESCRIPTION OF THE INVENTION

Aromatic carbonate polymer as the term is used herein is meant to include both the polycarbonates and the copolyestercarbonates. The aromatic polycarbonate resins for use herein can generally be prepared by the reaction of at least one dihydric phenol and a carbonate precursor, such as phosgene, a haloformate or a carbonate ester. Generally speaking, such carbonate polymers may be typified as being comprised of recurring structural units of the formula

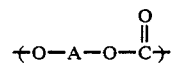

I.

wherein A is a divalent aromatic radical of the dihydric phenol employed in the polymer producing reaction. Preferably, the carbonate polymers used to provide the resinous compositions of the invention have an intrinsic viscosity (as measured in methylene chloride at 25° C.) ranging from about 0.30 to about 1.00 dl/g. The dihydric phenols which may be employed to provide such aromatic carbonate polymers may be represented by the general formula

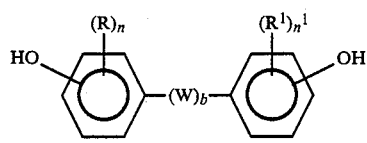

II.

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, —S—, —S—S—, —O—,

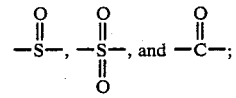

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene nd cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula $-OR^2$ wherein $R^2$ is a monovalent hydrocarbo radical of the type described hereinafore. Preferred monovalent hydrocarbonoxy radicals are the alkoxy and aryloxy radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-dihydroxydiphenyl ether;
4,4'-thiodiphenol;
4,4'-dihydroxy-3,3'-dichlorodiphenyl ether; and
4,4'-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436, incorporated herein by reference, or by transesterification processes such as disclosed in U.S. Pat. No. 3,153,008, incorporated by reference, as well as other processes known to those skilled in the art.

It is possible to employ two or more different dihydric phenols or a copolymer of a dihydric phenol with glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl)propane (bisphenol-A).

The copolyestercarbonate resins are well known in the art and are described, along with methods for their preparation, inter alia, in U.S. Pat. No. 3,169,121, incorporated herein by reference, as well in U.S. Pat. Nos. 4,238,596; 4,156,069 and 4,238,597, all of which are likewise incorporated herein by reference.

Briefly stated the high molecular weight thermoplastic aromatic copolyestercarbonates comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocylic groups.

These copolyester-carbonates contain ester bonds and carbonate bonds in the chain, wherein the amount of ester bonds is in the range of from about 25 to about 90 mole percent, preferably from about 35 to about 80 mole percent. For example, 5 moles of bisphenol-A reacting completely with 4 moles of isophthaloyl dichloride and 1 mole of phosgene would give a copolyestercarbonate of 80 mole percent ester bonds.

The copolyestercarbonates may be prepared by a variety of methods including interfacial polymerization, melt polymerization, and transesterification.

These copolyestercarbonates may be readily prepared by the reaction of a dihydric phenol, a carbonate precursor, and an ester precursor. The dihydric phenols and the carbonate precursors are the same as those described hereinafore for the preparation of the polycarbonates. The ester precursor may be a difunctional carboxylic acid or, preferably, its ester forming reactive derivative The difunctional carboxylic acids are described in U.S. Pat. No. 3,169,121, incorporated herein by reference.

The preferred ester forming reactive derivatives of the difunctional carboxylic acids are the diacid halides, preferably the diacid chlorides. Some illustrative non-limiting examples of these derivatives include isophthaloyl chloride, terephthaloyl chloride, and mixtures thereof. A particularly useful mixture of the ester forming reactive derivatives of isopthalic acid and terephthalic acid is one which contains, in a weight ratio, from about 1:10 to about 9.8:0.2 of isophthaloyl dichloride to terephthaloyl dichloride.

Also included within the scope of the instant invention are the thermoplastic randomly branched copolyestercarbonates. These are derived from a dihydric phenol, a carbonate precursor, an ester precursor, and a minor amount of a branching agent The branching agents are well known in the art and are generally aromatic compounds containing at least three functional groups which may be hydroxyl, carboxyl, carboxylic anhydride, haloformyl, or mixtures thereof. Some illustrative non-limiting examples of these branching agents include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

Also included herein are blends of linear and branched copolyestercarbonates.

A particularly useful class of aromatic copolyestercarbonates is that derived from bisphenol-A; phosgene; and isophthalic acid, terephthalic acid, or a mixture of isophthalic acid and terephthalic acid, or the reactive ester forming derivatives of these acids such as terephthaloyl dichloride, isophthaloyl dichloride, or a mixture of isophthaloyl dichloride and terephthaloyl dichloride. The molar range of terephthalate units, the remainder of the copolymer ester units preferably comprising isophthalate units, is generally from about 2 to about 90 percent, and preferably from about 5 to about 25 percent.

The epoxide compounds which are blended or mixed with the polycarbonate or copolyestercarbonate resin to provide the compositions of the instant invention are generally known in the art and are usually commercially available or may be readily prepared by known and conventional methods. These compounds are characterized by containing at least one oxirane ring, i.e.,

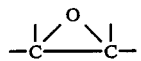

One useful group of epoxide compounds may be represented by the general formula

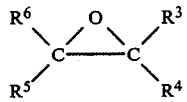   III.

wherein:

$R^3$–$R^6$ are independently selected from hydrogen, monovalent hydrocarbon radicals, substituted monovalent hydrocarbon radicals, —$CH_2OR^7$, —$CH_2OCOR^8Z$, —$COOCH_2Z$, and —$CH_2OR^8OCH_2Z$ radicals wherein $R^7$ is selected from monovalent hydrocarbon radicals, $R^8$ is selected from divalent hydrocarbon radicals, and Z is an oxirane ring; with the proviso that (i) at least $R^6$ and $R^5$ or $R^3$ and $R^4$ are independently selected from monovalent hydrocarbon radicals, substituted monovalent hydrocarbon radicals, —$CH_2OR^7$, —$CH_2OCOR^8Z$, —$COOCH_2Z$, and —$CH_2OR^8OCH_2Z$, or (ii) that at least one of $R^5$ or $R^6$ and at least one of $R^3$ and $R^4$ are independently selected from aromatic monovalent hydrocarbon radicals or substituted monovalent aromatic hydrocarbon radicals.

The monovalent hydrocarbon radicals represented by $R^3$–$R^6$ include the alkyl, alkenyl, cycloalkyl, cycloalkenyl, aryl, aralkyl, and alkaryl radicals. The preferred alkyl radicals are those containing from 1 to about 20 carbon atoms. They include both the straight chain and branched alkyl radicals. The preferred alkenyl radicals are those containing from 2 to about 20 carbon atoms. These alkenyls may contain one site of olefinic unsaturation, i.e., only one double bond, or they may be di- or polyunsaturated, e.g., dienes (either conjugated or non-conjugated). The preferred cycloalkyl radicals are those containing from 4 to about 8 ring carbon atoms. The preferred cycloalkenyl radicals are those containing from 4 to about 8 ring carbon atoms and one or two ring double bonds. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The substituted monovalent hydrocarbon radicals represented by $R^3$–$R^6$ are those monovalent hydrocarbon radicals which contain substituent groups thereof, preferably from 1 to about 4 substituent groups. The substituent groups are preferably selected from halogen, hydroxyl, amino, and nitro groups, or mixtures thereof.

The monovalent hydrocarbon radicals represented by $R^7$ are the same as those described hereinafore for $R^3$–$R^6$, including those containing the afore-described substituent groups, i.e., substituted monovalent hydrocarbon radicals. The divalent hydrocarbon radicals represented by $R^8$ include the alkylene, alkenylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred alkenylene radicals are those containing from 2 to about 20 carbon atoms and one or more sites of olefinic unsaturation, i.e., double bonds. Preferably these alkenylene radicals contain from 1 to about 4 double bonds. When more than one double bond is present they may be conjugated or non-conjugated. The preferred cycloalkylene and cycloalkylidene radicals are those containing from 4 to about 16 ring carbon atoms.

Another useful group of epoxides are the cyclic epoxides which may be represented by the general formula

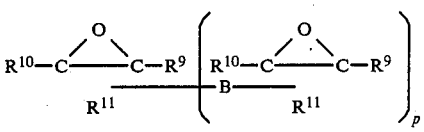   IV.

wherein:

$R^9$ and $R^{10}$ independently have the same meaning as $R^3$–$R^6$ hereinafore with the proviso that at least one of $R^9$ and $R^{10}$ is a radical other than hydrogen, i.e., both $R^9$ and $R^{10}$ are not hydrogen;

$R^{11}$ is a divalent hydrocarbon radical or a substituted divalent hydrocarbon radical which together with the two carbon atoms of the oxirane ring forms a ring system containing from 1 to 3 rings having from 4 to about 20 carbon atoms;

p is either zero or one; and

B is a divalent radical selected from divalent hydrocarbon radicals, divalent hydrocarbon radicals containing at least one ether linkage, and the

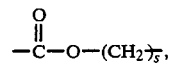

radicals wherein s has a value of from 1 to about 6.

The preferred divalent and substituted divalent hydrocarbon radicals represented by $R^{11}$ are the aliphatic divalent and substituted divalent aliphatic hydrocarbon radicals. These aliphatic radicals may be fully saturated or they may contain olefinic unsaturation, preferably one or two double bonds. The preferred divalent aliphatic hydrocarbon radicals are the alkylene radicals, alkenylene radicals, cycloalkylene radicals, and cycloalkylidene radicals. These alkylene, alkenylene, cycloalkylene and cycloalkylidene radicals may contain the aforedescribed substituent groups thereon. The preferred alkylene radicals are those containing from 2 to about 20 carbon atoms. The preferred alkyenylene radicals are those containing from 2 to about 20 carbon atoms and one or two double bonds. The preferred cycloalkylene and cycloalkylidene radicals are those containing from 4 to about 16 ring carbon atoms.

The divalent hydrocarbon radicals represented by B include the alkylene, cycloalkylene, alkylidene, cycloalkylidene, arylene, alkarylene, and aralkylene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from about 4 to about 16 ring carbon atoms. The preferred arylene radicals are those containing from 6 to 12 ring carbon atoms, i.e., phenylene, naphthalene, and biphenylene. The preferred aralkylene and alkarylene radicals are those containing from 7 to about 20 carbon atoms.

The divalent hydrocarbon radicals containing ether linkages represented by B are those that contain from 2 to about 14 carbon atoms and from 1 to about 4 ether linkages. Preferred radicals of this type are the alkylene ether radicals which contain from 2 to about 14 carbon atoms and from 1 to about 4 ether linkages.

Preferred divalent hydrocarbon radicals represented by B are the alkylene radicals.

These types of epoxides are well known in the art and are generally commercially available or may be readily prepared by known and conventional processes. Some of these types of epoxides are described, inter alia, in U.S. Pat. No. 4,154,329, incorporated herein by reference.

Some illustrative non-limiting examples of the epoxides of Formula IV include, when p is zero, the derivatives of epoxy cyclohexane. When p is one the epoxides of Formula IV include compounds such as

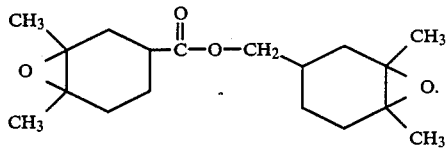

As mentioned above the epoxides of Formula IV include the derivatives of epoxy cyclohexane. These derivatives of epoxy cyclohexane may be represented by the general formula

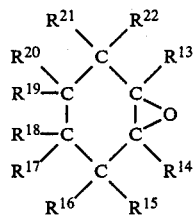

V.

wherein:

$R^{13}$–$R^{22}$ independently have the same meaning as $R^3$–$R^6$ hereinafore, with the proviso that at least one of $R^{13}$ and $R^{14}$ is a radical other than hydrogen, i.e., both $R^{13}$ and $R^{14}$ are not hydrogen.

These derivatives of epoxy cyclohexane are well known in the art and are generally commercially available or may be readily prepared by known and conventional methods. They are among the compounds described, inter alia, in U.S. Pat. No. 3,978,020, incorporated herein by reference.

Yet another group of epoxides that are useful may be represented by the general formula

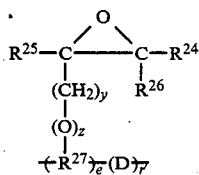

VI.

wherein:

$R^{24}$–$R^{26}$ are independently selected from hydrogen, monovalent hydrocarbon radicals, and substituted monovalent hydrocarbon radicals, with the proviso (i) that at least $R^{25}$ or both $R^{24}$ and $R^{26}$ are independently selected from monovalent hydrocarbon radicals or substituted monovalent hydrocarbon radicals, or (ii) that $R^{25}$ and at least one of $R^{24}$ and $R^{26}$ are independently selected from aromatic hydrocarbon radicals or substituted aromatic hydrocarbon radicals;

$R^{27}$ is a divalent hydrocarbon radical, a substituted divalent hydrocarbon radical, or a divalent hydrocarbon radical containing at least one ether linkage;

e has a value of at least one;

r' has a value of either zero or at least one;

y has a value of from 0 to about 4;

z is either zero or one, with the proviso that y and z are not both zero; and

D is a divalent hydrocarbon radical, a substituted divalent hydrocarbon radical, or a divalent hydrocarbon radical containing at least one ether linkage.

The divalent hydrocarbon radicals and divalent hydrocarbon radicals containing at least one ether linkage represented by $R^{27}$ and D are the same as those described for B hereinafore. The substituted divalent hydrocarbon radicals represented by $R^{27}$ and D are those radicals as described for B except that they contain from 1 to about 4 substituent groups which may be selected from $C_1$–$C_{12}$ alkyl, halogen, nitro, amino and hydroxyl.

The monovalent hydrocarbon radicals represented by $R^{24}$–$R^{26}$ are the same as those described for $R^3$–$R^6$ hereinafore. Likewise, the substituted monovalent hydrocarbon radicals represented by $R^{24}$–$R^{26}$ are the same as those described for $R^3$–$R^6$ hereinafore.

Illustrative of the epoxides of Formula VI are those wherein z is one, y is one, $R^{24}$–$R^{26}$ are methyl, r' is zero, e is greater than one, and $R^{27}$ is an aromatic radical, preferably a $C_6$ aromatic radical. These types of compounds, e.g., epoxy novolac resins, are generally commercially available or may be readily prepared by known and conventional methods.

Yet another group of useful epoxides are the triglycidylisocyanurates. These may be represented by the general formula

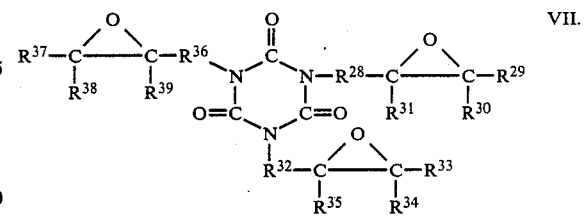

VII.

wherein $R^{29}$–$R^{31}$, $R^{33}$–$R^{35}$ and $R^{37}$–$R^{39}$ independently have the same meaning as $R^3$–$R^6$ hereinafore, with the proviso (1) that (i) at least $R^{31}$ or both $R^{29}$ and $R^{30}$ are other than hydrogen, (ii) at least $R^{35}$ or both $R^{33}$ and $R^{34}$ are other than hydrogen, and (iii) at least $R^{39}$ or both $R^{37}$ and $R^{38}$ are other than hydrogen, or (2) that (i) $R^{31}$ and at least one of $R^{29}$ and $R^{30}$ are aromatic radicals, (ii) $R^{35}$ and at least one of $R^{33}$ and $R^{34}$ are aromatic radicals, and (iii) $R^{39}$ and at least one of $R^{37}$ and $R^{38}$ are aromatic radicals;

$R^{28}$, $R^{32}$ and $R^{36}$ are independently selected from alkylene radicals containing from 1 to about 8 carbons.

These triglycidylisocyanurates are well known in the art and are generally commercially available or may be readily prepared by known and conventional processes.

An illustrative non-limiting example of a compound of Formula VII is one wherein $R^{29}$–$R^{31}$, $R^{33}$–$R^{35}$ and $R^{37}$–$R^{39}$ are all methyl radicals; and $R^{28}$, $R^{32}$ and $R^{36}$ are all the methylene radical.

Some illustrative non-limiting examples of the epoxide compounds that may be utilized in the practice of the present invention include limonene dioxide, limonene monoxide, alpha-pinene oxide, tetraphenylethylene epoxide, tetramethylene ethylene oxide, 1,1-diphenylethylene oxide, 2,3-epoxy-2,3-dimethylbutane, 4,5-epoxy-4,5-dimethyloctane, 1,2-epoxy-2-methylpropane-4,5-epoxy-4-methyloctane, 1,2-diphenylethylene oxide, 1,2-epoxy-1-phenyl-2-methyl propane, 1,1-dicyclohexaneethylene oxide, 1,2-epoxy- 2-methylcyclohexane, 1,2-epoxy-1,2-dimethylcyclohexane, 1,2-epoxy-1-phenyl-cyclohexane, 1,2-epoxy-1-propylcyclohexane, 1,2-epoxy-1,2,3,5-tetramethylcyclohexane, 1,2-epoxy-1-methyl-2-t-butylcyclohexane, 2,3-epoxy-3-methylbutane, and 2,3-epoxy-3-phenylbutane.

The epoxide compounds of the present invention may be used alone or as mixtures of two or more different epoxides. Thus for example, two different epoxides of Formula III may be used; two different epoxides of Formula IV may be used; an epoxide of Formula III and an epoxide of Formula IV may be used; a mixture containing an epoxide of Formula III, an epoxide of Formula IV, and an epoxide of Formula VII may be used; and the like.

The amount of the epoxide compound present in the instant compositions is an amount which upon exposure of the composition to sterilizing radiation is effective in reducing or retarding the yellowing of the aromatic carbonate resin, i.e., an antiyellowing upon exposure to sterilizing radiation effective amount. Generally, this amount is at least about 0.01 weight percent, preferably at least about 0.05 weight percent. Weight % epoxide is measured based on total amounts of epoxide and polycarbonate present. Generally amounts in excess of about 3 weight % epoxide should not be exceeded, preferably about 1 weight percent. In general the exact amount of epoxide used will depend upon the particular epoxide used and the nature of the aromatic carbonate polymer with which the particular epoxide compound is admixed.

The admixtures of the aromatic carbonate polymer and the epoxide compound or compounds are simply prepared by standard techniques, for example dry mixing and melt extruding at an elevated temperature The extruded admixture is then molded into a piece of specific dimensions or further extruded into a film or sheet product, The radiation employed to achieve steriliztion of the particular object is ionizing radiation, usually gamma radiation. The quantity of gamma radiation depends upon various factors such as thickness of the irradiated article and the like, but is generally from about 0.5 to about 7 Megarads, preferably from about 1.0 to about 3.0 Megarads.

The compositions of the instant invention may optionally contain the commonly known and used additives such as, for example, antioxidants; mold release agents; other color stabilizers such as the organophosphites; ultraviolet radiation stabilizers such as the benzophenones, benzotriazoles, and cyanoacrylates; and flame retardants such as the alkali or alkaline earth metal salts of organic sulfonic acids or brominated polymers.

As stated previously, the method of the present invention, can be used to successfully inhibit yellowing of aromatic carbonate polymers in a variety of structures, for example, packaging containers for the irradiated medical materials and aromatic carbonate containing medical devices such as blood oxygenators, anesthesia cannisters, blood centrifuge bowls, and the like.

Particularly preferred epoxide compounds of Formula III are those wherein all of $R^3$–$R^6$ are radicals other than hydrogen.

Particularly preferred epoxide compounds of Formula IV are those wherein both $R^9$ and $R^{10}$ are radicals other than hydrogen.

Particularly preferred epoxide compounds of Formula V are those wherein both $R^{13}$ and $R^{14}$ are radicals other than hydrogen.

Particularly preferred epoxide compounds containing the recurring structural units of Formula VI are those wherein $R^{25}$, $R^{24}$ and $R^{26}$ are radicals other than hydrogen.

Particularly preferred epoxide compounds of Formula VII are those wherein $R^{29}$–$R^{31}$, $R^{33}$–$R^{35}$ and $R^{37}$–$R^{39}$ are all radicals other than hydrogen.

The flame retardant alkali and alkaline earth metal salts of organic sulfonic acids which may be admixed with the compositions of the instant invention in order to render them flame retardant are disclosed, inter alia, in U.S. Pat. Nos. 3,933,374; 3,948,851; 3,926,908; 3,919,167; 3,909,490; 3,953,396; 3,931,100; 3,978,024; 3,853,399; 3,917,559; 3,951,910 and 3,940,366, all of which are incorporated herein by reference.

The instant compositions may also optionally contain the well known and conventionally used fillers such as clay, talc, mica, glass (chopped fiberglass and glass particles), and the like. These fillers, if present, should generally not exceed about 50 weight percent, based on the amount of filler and polycarbonate resin, preferably 30 weight percent. The instant compositions may also optionally contain the well known impact modifiers in an impact modifying amount. These impact modifiers are disclosed, interalia, in U.S. Pat. No. 4,512,980 to Miller, incorporated herein by reference.

DESCRIPTION OF THE PREFERRED EMBODIMENTS

In order to more fully and clearly illustrate the present invention the following examples are set forth. It is intended that these examples be considered as illustrative of the present invention rather than limiting the invention thereto. In the examples all parts and percentages are on a weight basis unless otherwise specified.

The following examples illustrate compositions falling outside the scope of the instant invention. They are presented for comparative purposes only.

EXAMPLE 1

A polycarbonate resin (comprised of the reaction products of bisphenol-A and phosgene) was molded into test plaques ⅛" thick. These test plaques were exposed to a $Co^{60}$ source on a continuous conveyor system, dosimetry was monitored with a calibrated NBS radiochromic, nylon dosimeter. The Y.I. (yellowness index) was measured on a Gardner Colorimeter in accordance with ASTM test method D1925 both before irradiation and after the test plaques had been exposed to 3.0 megarads (MRADS). The results of these Y.I. measurements are set forth in Table I.

EXAMPLE 2

The procedure of Example 1 is substantially repeated except that 0.11 weight percent of 7-oxabicyclo[4.1.0-]heptyl-3-methyl-3-[7-oxabicyclo[4.1.0]heptane]carboxylate is added to the polycarbonate resin. The resultant mixture is formed into test plaques as in Example 1 and the YI of these test plaques is determined, before and after irradiation, in accordance with the procedure of Example 1. The results are set forth in Table I.

EXAMPLE 3

The procedure of Example 2 is substantially repeated except that 0.22 weight percent of the epoxide of Example 2 is mixed with the polycarbonate resin. The YI is determined both before and after irradiation and the results are set forth in Table I.

EXAMPLE 4

A polycarbonate resin (comprised of the reaction products of bisphenol-A and phosgene) was molded into test plaques ⅛" thick. These test plaques were exposed to a Co$^{60}$ source on a continuous conveyor system, dosimetry was monitored with a calibrated NBS radiochromic nylon dosimeter. The Y.I. (yellowness index) was measured on a Gardner Colorimeter in accordance with ASTM test method D1925 both before irradiation and after the test plaques had been exposed to 3.4/3.5 MRADS and 6.2/6.4 MRADS. The results are set forth in Table II.

The following examples illustrate the compositions of the present invention.

EXAMPLE 5

The procedure of Example 4 is substantially repeated except that 0.14 weight percent of limonene dioxide is admixed with the polycarbonate resin. The resultant mixture is formed into test plaques and the YI of these test plaques is determined in accordance with the procedure of Example 4. The results are set forth in Table II.

EXAMPLE 6

The procedure of Example 4 is substantially repeated except that 0.13 weight percent of limonene monoxide is admixed with the polycarbonate resin. The resultant mixture is formed into test plaques and the YI of these test plaques is determined in accordance with the procedure of Example 4. The results are set forth in Table II.

EXAMPLE 7

The procedure of Example 4 is substantially repeated except that 0.13 weight percent of alpha-pinene oxide is admixed with the polycarbonate resin. The resultant mixture is formed into test plaques and the YI of these test plaques is determined in accordance with the procedure of Example 4. The results are set forth in Table II.

TABLE I

| Example No. | YI (0 MRADS) | YI (3.0 MRADS) | Wt. % Additive |
|---|---|---|---|
| 1 | 1.7 | 21.7 | 0 |
| 2 | 1.7 | 21.7 | 0.11 |
| 3 | 1.7 | 21.7 | 0.22 |

TABLE II

| Example No. | YI MRADS 0 | YI MRADS 3.4/3.5 | YI MRADS 6.2/6.4 | Wt. % Additive |
|---|---|---|---|---|
| 4 | 2.2 | 25.5 | 49.3 | 0 |
| 5 | 2.1 | 17.9 | 37.4 | 0.14 |
| 6 | 1.4 | 15.5 | 32.2 | 0.13 |
| 7 | 1.9 | 17.4 | 37.4 | 0.13 |

As illustrated by the data in Table I an epoxide falling outside the scope of the instant invention, i.e., one containing a hydrogen atom bonded to each of the carbon atoms of the oxirane ring (Examples 2 and 3) is ineffective in stabilizing the color or reducing yellowing of an irradiated polycarbonate test plaque. In sharp contrast to this the data in Table II illustrates that the compositions of the instant invention (Examples 5-7) exhibit reduced yellowing upon exposure to sterilizing irradiation compared to an unstabilized polycarbonate composition (Example 4) and to polycarbonate compositions containing an epoxide falling outside the scope of the instant invention (Examples 2 and 3).

The epoxides of the present invention may be characterized as ones which: (i) contain at least one quaternary oxirane ring carbon atom, i.e. a carbon atom which is bonded to four other atoms, none of which are hydrogen; or (ii) wherein both of the carbon atoms of the oxirane ring are bonded to at least one aromatic hydrocarbon moiety or a substituted aromatic hydrocarbon moiety.

The compositions of the instant invention are useful for the preparation of shaped articles such as extruded or molded articles.

Obviously, other modifications and variations of the present invention are possible in light of the above teachings. It is, therefore, to be understood that changes may be made in the particular embodiments as described herein which are within the full intended scope of the invention as defined by the appended claims.

What is claimed is:

1. A composition sufficiently irradiated to achieve sterilization comprising:
   (i) at least one aromatic carbonate resin; and
   (ii) an antiyellowing upon exposure to sterilizing irradiation effective amount of at least one epoxide compound selected from epoxides containing at least 1 quaternary oxirane ring carbon atom, epoxides having each of the 2 oxirane ring carbon atom bonded to at least 1 aromatic hydrocarbon moiety or substituted aromatic hydrocarbon moiety, or mixtures thereof.

2. The composition of claim 1 wherein said anti-yellowing effective amount of said epoxide is at least about 0.01 weight percent, based on the total amounts of (i) and (ii) present.

3. The composition of claim 2 wherein said anti-yellowing effective amount is at least about 0.05 weight percent.

4. The composition of claim 1 wherein said epoxide compound is represented by the formula

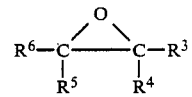

wherein:

$R^3$–$R^6$ are independently selected from hydrogen, monovalent hydrocarbon radicals, substituted monovalent hydrocarbon radicals, —$CH_2OR^7$, —$CH_2OCOR^8Z$, —$COOCH_2Z$, or —$CH_2OR^8OCH_2Z$ radicals where $R^8$ is a divalent hydrocarbon radical, $R^7$ is a monovalent hydrocarbon radical, and Z is an oxirane ring, with the proviso (1) that at least $R^6$ and $R^5$ or $R^3$ and $R^4$ are other than hydrogen, or (2) that at least one of $R^5$ and $R^6$ and at least one of $R^3$ and $R^4$ are independently selected from monovalent aromatic hydrocarbon radicals or monovalent substituted aromatic hydrocarbon radicals.

5. The composition of claim 1 wherein said epoxide compound is represented by the formula

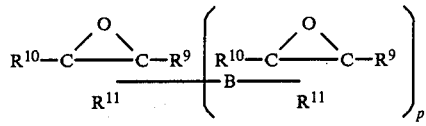

wherein:
$R^9$ and $R^{10}$ are independently selected from hydrogen, monovalent hydrocarbon radicals, substituted monovalent hydrocarbon radicals, —$CH_2OR^7$, —$CH_2OCOR^8Z$, —$COOCH_2Z$, or —$CH_2OR^8OCH_2Z$ radicals wherein $R^7$ is a monovalent hydrocarbon radical, $R^8$ is a divalent hydrocarbon radical, and Z is an oxirane ring, with the proviso that at least one of $R^9$ and $R^{10}$ is other than hydrogen;

$R^{11}$ is a divalent hydrocarbon radical or a substituted divalent hydrocarbon radical;

B is a divalent radical selected from divalent hydrocarbon radicals, divalent hydrocarbon radicals containing at least one ether linkage, or the

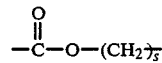

radicals wherein s has a value of from 1 to about 6: and p is either zero or one.

6. The composition of claim 5 wherein p is zero.

7. The composition of claim 6 wherein $R^{11}$ is a $C_4$ alkylene radical.

8. The composition of claim 7 wherein said epoxide is a derivative of epoxy cyclohexane.

9. The composition of claim 5 wherein p is one.

10. The composition of claim 2 wherein said aromatic carbonate resin is an aromatic polycarbonate resin.

11. The composition of claim 1 wherein said aromatic carbonate resin is an aromatic polycarbonate resin.

* * * * *

UNITED STATES PATENT AND TRADEMARK OFFICE
CERTIFICATE OF CORRECTION

PATENT NO. : 4,894,401

DATED : January 16, 1990

INVENTOR(S) : Linda Harmon Nelson

It is certified that error appears in the above-identified patent and that said Letters Patent is hereby corrected as shown below:

Column 3, line 8, delete "hydrocarbo" and add --hydrocarbon--

Signed and Sealed this

Sixth Day of November, 1990

*Attest:*

HARRY F. MANBECK, JR.

*Attesting Officer*      *Commissioner of Patents and Trademarks*